United States Patent [19]
Wan et al.

[11] Patent Number: 5,721,572
[45] Date of Patent: Feb. 24, 1998

[54] METHOD OF CREATING AND USING A FOUR COLOR DEVICE GAMUT DESCRIPTOR

[75] Inventors: Shijie Wan, Rochester; Kevin Edward Spaulding, Spencerport, both of N.Y.

[73] Assignee: Eastman Kodak Company, Rochester, N.Y.

[21] Appl. No.: 634,685

[22] Filed: Apr. 18, 1996

Related U.S. Application Data

[63] Continuation of Ser. No. 230,958, Apr. 21, 1994, abandoned, which is a continuation-in-part of Ser. No. 68,887, May 28, 1993, abandoned.

[51] Int. Cl.$^6$ ................................................. G06T 15/00
[52] U.S. Cl. .................................................. 345/431
[58] Field of Search .............................. 395/118, 131; 358/518–20

[56] References Cited

U.S. PATENT DOCUMENTS

| H1506 | 12/1995 | Beratta | 345/199 |
|---|---|---|---|
| 4,941,038 | 7/1990 | Walowit | 358/518 |
| 5,003,299 | 3/1991 | Batson et al. | 345/199 |
| 5,065,234 | 11/1991 | Hung et al. | 358/523 |
| 5,087,126 | 2/1992 | Pochieh | 356/402 |
| 5,333,243 | 7/1994 | Best et al. | 395/109 |
| 5,384,901 | 1/1995 | Glassner et al. | 395/131 |
| 5,416,890 | 5/1995 | Beratta | 395/131 |
| 5,481,655 | 1/1996 | Jacobs | 395/109 |
| 5,500,921 | 3/1996 | Ruetz | 395/109 |
| 5,510,910 | 4/1996 | Bockman et al. | 358/502 |
| 5,537,228 | 7/1996 | Dillinger | 358/502 |
| 5,583,666 | 12/1996 | Ellson et al. | 358/518 |

OTHER PUBLICATIONS

*Surfaces In Computer Aided Geometric Design*; 1983; pp. 99–107.

Lay, Steven R.; *Convex Sets and Their Applications*; 1982; pp. 16–21.

Kallay, Michael; *Convex Hull Made Easy*; Mar. 1986; p. 161.

Robertson et al.; *The Application of Perceptual Color Spaces to the Display of Remotely Sensed Imagery*; Jan. 1988; pp. 49–59.

Robertson, Philip K.; *Visualizing Color Gamuts: A User Interface for the Effective Use of Perceptual Color Spaces in Data Displays*; Sep. 1988; pp. 50–64.

Stone et al.; *Color Gamut Mapping and the Printing of Digital Color Images*; 1988; pp. 249–292.

(List continued on next page.)

*Primary Examiner*—Heather R. Herndon
*Assistant Examiner*—Rudolph Buchel
*Attorney, Agent, or Firm*—Thomas H. Close

[57] ABSTRACT

A device gamut boundary surface in a device independent color space (DICS) is defined by a set of small triangles. Each triangle in the DICS corresponds to a triangle on the surface of a 3D or 4D color cube in a device dependent color space (DDCS). The triangles in the DICS are derived based on a look-up table which can be obtained by measuring a set of color patches produced from the given device. A small set of carefully selected gamut boundary points in the DICS are determined, and their corresponding points or signals on the surface of the color cube in the DDCS are computed. These data are stored in a table called a gamut descriptor. Points in a gamut descriptor can be determined by a convex polyhedral cone inclusion process, and their corresponding points in the DDCS can be determined by triangle interpolation. The gamut descriptor usually includes gamut boundary points at a number of lightness layers along a series of predetermined hue angles. Gamut descriptor is a compact representation of gamut boundary. The point distribution pattern in a gamut descriptor provides useful information for determining in-gamut and out-of-gamut points, and for fast mapping between color spaces in cross-media color calibration.

7 Claims, 11 Drawing Sheets

OTHER PUBLICATIONS

Gentile et al.; *A Comparison of Techniques for Color Gamut Mismatch Compensation*; Oct. 1990; pp. 176–181.

Kanamori et al.; *Color Correction Technique for Hard Copies by 4–Neighbors Interpolation Method*; Jan./Feb. 1992; pp. 73–80.

Kanamori et al.; *A Color Transformation Algorithm Using "Prism" Interpolation*; 1992; pp. 477–482.

Foley, James D., et al., "Computer Graphics: Principles and Practices", Addison–Wesley Publishing Co., 2nd ed. pp. 584–599, 1990, (hereinafter Foley).

METHOD OF CREATING AND USING A FOUR COLOR DEVICE GAMUT DESCRIPTOR

CROSS-REFERENCE TO RELATED APPLICATIONS

This is a Continuation of application Ser. No. 08/230,958, filed Apr. 21, 1994, now abandoned, which is a Continuation-in-Part of application U.S. Ser. No. 08/068, 887, now abandoned, filed May 28, 1993.

This application is related to concurrently filed applications entitled Method And Apparatus For Mapping Between Color Spaces And Creating A Three Dimensional Inverse Look-up Table by Wan, Miller and Sullivan U.S. Ser. No. 08/068,941, filed May 28, 1993 now abandoned, and entitled Method and Apparatus For Convex Interpolation For Color Calibration by Wan, Miller and Sullivan U.S. Ser. No. 08/068,823, filed May 28, 1993, now U.S. Pat. No. 5,625, 974, both incorporated by reference herein.

BACKGROUND OF THE INVENTION

1. Field of the Invention

The present application is directed to a method and apparatus for creating a gamut descriptor used for converting color data from one color space to another color space and, more particularly, to a system which allows fast color calibration using a carefully selected set of gamut boundary points in a device independent color space.

2. Description of the Related Art

Figure 1:
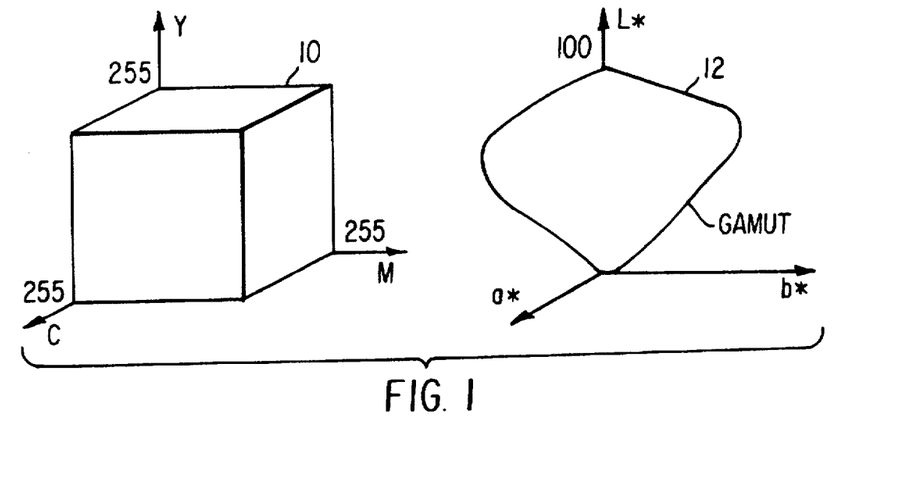
FIG. 1 illustrates a device dependent color cube 10 and a corresponding device independent gamut 12.

A color device such as CRT or printer is driven by 3 or 4 color signals to produce or display colors. Color signals for CRTs are R (red), G (green), B (blue), while color signals for printers are C (cyan), M (magenta), Y (yellow) and an additional signal K (black) may be used for some printers. A color space which uses R,G,B or C,M,Y signals is called a device dependent color space (DDCS). The R,G,B or C,M,Y signals are usually integers from 0 to 255. For a printer, the signal range of C,M,Y is bounded by a color cube 10 as depicted in FIG. 1. In total, there are typically 256×256×256 (about 16.7 million) different combinations of code values or signals in the cube 10, and therefore the printer can produce 256×256×256 different colors. Each color produced by the printer can be measured by conventional physical instruments measuring a color patch to determine its location (a point) or color signal in the standard CIEXYZ color space, which can then be conventionally converted into a point (or color signal) in standard CIELAB (or L*a*b*) space or CIELUV space (or L*u*v*), which are device independent color spaces (DICSs). The range (volume) occupied by the 256×256×256 points of the color cube 10, when converted into signals in the CIELAB space, is called the gamut 12 of the device. By definition, a device gamut means or defines all the colors in L*a*b* that the device can produce. Colors located on the gamut 12 boundary in L*a*b* are produced by the signal values on the surface of the color cube 10 in CMY.

Figure 2:
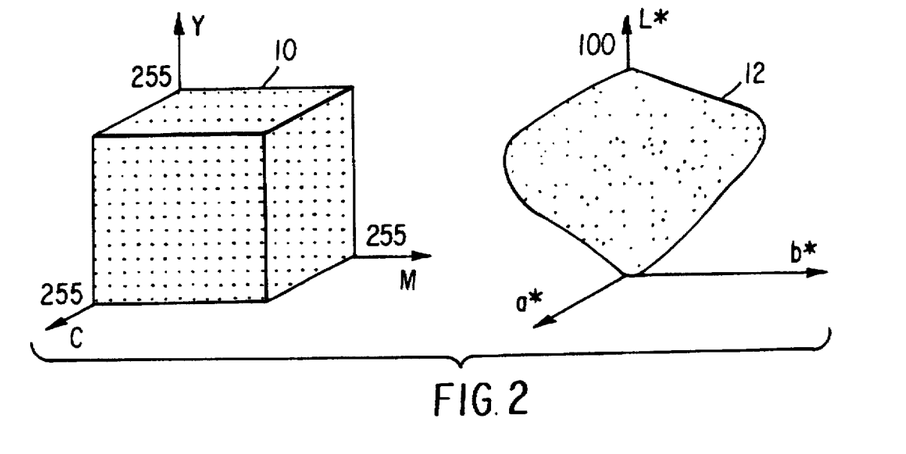
FIG. 2 depicts lattice points in the color cube 10 and the irregularly distributed corresponding points in the device independent space forming the gamut.

Using the above method, one can determine the gamut of a given printer precisely. However, this method would require measuring about 16.7 million color patches, which is almost impossible in practice. A more practical method is to measure a small number of color patches (say, 512) and convert them into points or signals in the device independent space (L*a*b*). For convenience, the signal values for these color patches are usually chosen to be lattice points, covering the full range of the cube 10. FIG. 2 depicts the distribution of the color cube lattice points for the color patches in CMY and L*a*b* spaces. Storing these points in a table, one obtains a so called look-up table (LUT) from CMY to L*a*b*. Based on the LUT, interpolation methods can then be used to map arbitrarily designated points between the two spaces.

As can be seen the lattice points in the cube 10 of FIG. 2 are regularly distributed while the corresponding points in the gamut 12 are irregularly distributed. Using the LUT the mapping of arbitrarily positioned color signals from CMY to L*a*b* is quick and easy because the points in the LUT are lattice points in CMY space. However, the reverse conversion from L*a*b* to CMY is much more difficult because the entry points in the L*a*b* space used for the interpolation are not lattice points. To perform the reverse conversion efficiently, an inverse look-up table is needed which includes L*a*b* lattice points as entry points. To efficiently create the inverse look-up, the gamut boundary needs to be determined, and a compact version of the gamut boundary will allow points outside the gamut 12 to be efficiently converted into points inside the gamut 12.

SUMMARY OF THE INVENTION

It is an object of the present invention to provide a method to determine a gamut boundary point along a given direction.

It is another object of the present invention to create and use a gamut descriptor or compact representation of the gamut boundary to describe the gamut boundary of a device.

It is also an object of the present invention to provide a method of creating a gamut descriptor using a CMY to L*a*b* look-up table.

It is another object of the present invention to provide a method to determine whether a given vector is enclosed by a convex polyhedral cone (CPC) in a d-dimensional vector space $R^d$.

It is a further object of the present invention to provide a method to determine the intersection of a line in a plane defined by three points where the line is enclosed by a convex polyhedral cone formed of three points.

It is a further object of the present invention to provide one to one invertible interpolation method between two triangles in two three dimensional spaces.

It is also an object of the present invention to provide a method to define and construct a gamut boundary using a set of triangles (planes) based on a given look-up table.

It is also an object of the present invention to provide a method to determine whether or not a given point or signal is within a gamut.

The above objects can be attained by using a gamut descriptor. A gamut descriptor is a set of carefully selected gamut boundary points or signals in a device independent color space. The signals in the gamut descriptor can be determined once the definition of the gamut boundary is given. The present invention defines the gamut boundary using a set of triangles obtainable from a given look-up table. The gamut descriptor signals are all located on the triangles forming the boundary. These signals can be determined by using a convex polyhedral cone inclusion process. The corresponding point or signal in the device dependent color space is then determined by triangle interpolation. A list of the points on each layer defines the gamut descriptor which is a representation of the gamut boundary on this layer. The gamut descriptor is used to create an inverse look-up table for transforming color signals from the device independent space to the device dependent space.

DESCRIPTION OF THE PREFERRED EMBODIMENTS

The present invention provides a fast method to create a device gamut descriptor. The gamut descriptor is used to produce an inverse look-up table (ILUT) which helps in mapping points or signals in a device independent color space (DICS) to points in a device dependent color space (DDCS). The device gamut descriptor can also be used to speed up the mapping from the DICS to the DDCS when an ILUT is not available. A gamut descriptor is a small set of carefully selected device gamut boundary points or signals in the DICS. These points are uniformly distributed on the gamut boundary, and cover the full range of the gamut. The descriptor points are preferably located on a set of equally spaced planes perpendicular to the axis L*, if the device independent space chosen is L*a*b* or L*u*v*, and angularly equidistant around each plane. This distribution pattern of gamut boundary points in the gamut descriptor provides useful information for fast mapping from the DICS to the DDCS.

Depending on the application, the size of a gamut descriptor can be chosen to be from several hundred to several thousand points. Compared with the size of an image, and the size of an ILUT, a gamut descriptor is a small set of points. Computing a gamut descriptor is not time consuming as will be discussed in more detail herein.

Figure 3:
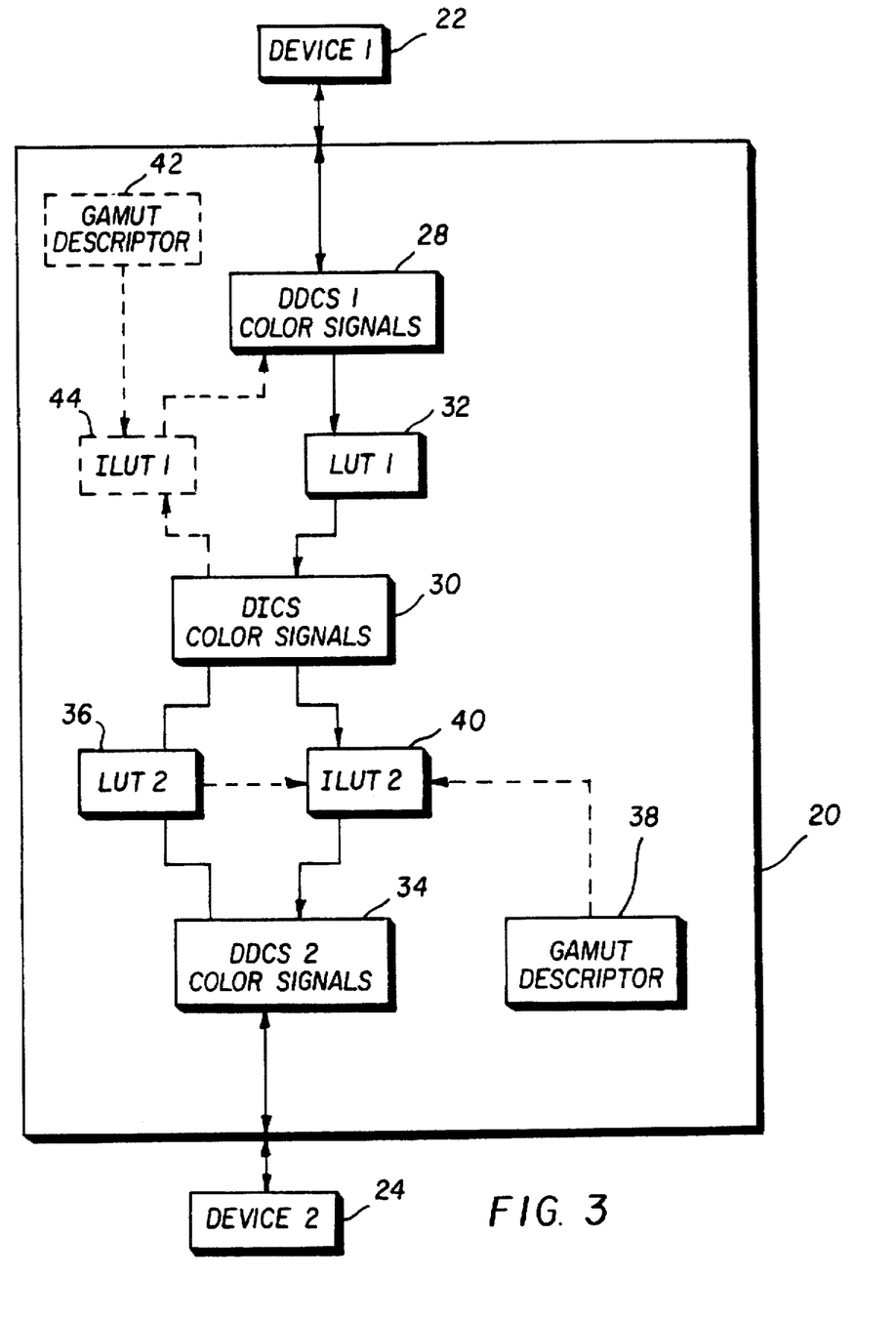
FIG. 3 depicts the hardware components of the present invention.

As illustrated in FIG. 3, the present invention includes a computer 20, such as a Sun Workstation or Apple Macintosh, and two color output devices 22 and 24 which can be printers or CRTs from different manufacturers. Stored in the computer is an image 28, that is, the color signals which are used to create the image on the first device 22. The present invention is designed to help convert such an image into device dependent color space signals for the second device 24. In this conversion process, color signals 28 in the device dependent color space color are converted into color signals 30 in device independent color space using a conventional forward interpolation and the look-up table 32 for the first device 22. The color signals 30 in the device independent color space can be converted into device dependent color signals 34 for the second device 24 with the look-up table 36, which is normally used to convert color signals 34 for device 2 into the independent color signals 30, by using backward interpolation. However, it is much faster if the mapping is performed using an inverse look-up table 40 and forward interpolation. The inverse look-up table 40 is created using the look-up table 36 and a gamut descriptor 38 for the second device 24. A detailed description of how to efficiently create the ILUT 40 is provided in the related application previously mentioned and entitled Method And Apparatus For Mapping Between Color Spaces And Creating A Three Dimensional Inverse Look-Up Table, and a description of how to effectively convert color signals from the device independent space to the device dependent space is provided in the related application previously mentioned and entitled Method And Apparatus For Convex Interpolation For Color Calibration. The present invention of course can also use a gamut descriptor 42 to convert images for the second device 24 to images for the first device 22.

Before describing the steps in creating the gamut descriptor, several algorithms will be discussed which are used in the subsequent discussion.

Let $Y=\{y_1, y_2, \ldots, y_n\}$ be a set of points in a d-dimensional Euclidean space $R^d$. The convex polyhedral cone of Y, denoted by CPC(Y), is a set in $R^d$ defined by:

$$CPC(Y) = \left\{ y|y = \sum_{i=1}^{n} \alpha_i y_i, \alpha_1, \ldots, \alpha_n \geq 0 \right\} \quad (1)$$

The convex hull of Y, denoted by CH(Y), is a set in $R^d$ defined by:

$$CH(Y) = \left\{ y|y = \sum_{i=1}^{n} \alpha_i y_i, \alpha_1, \ldots, \alpha_n \geq 0, \sum_{i=1}^{n} \alpha_i = 1 \right\}. \quad (2)$$

A vector y is enclosed by the cone CPC(Y) if there exist n coefficients $\alpha_1, \alpha_2, \ldots, \alpha_n$ such that:

$$y = \sum_{i=1}^{n} \alpha_i y_i, \alpha_1, \ldots, \alpha_n \geq 0. \quad (3)$$

Figure 4:
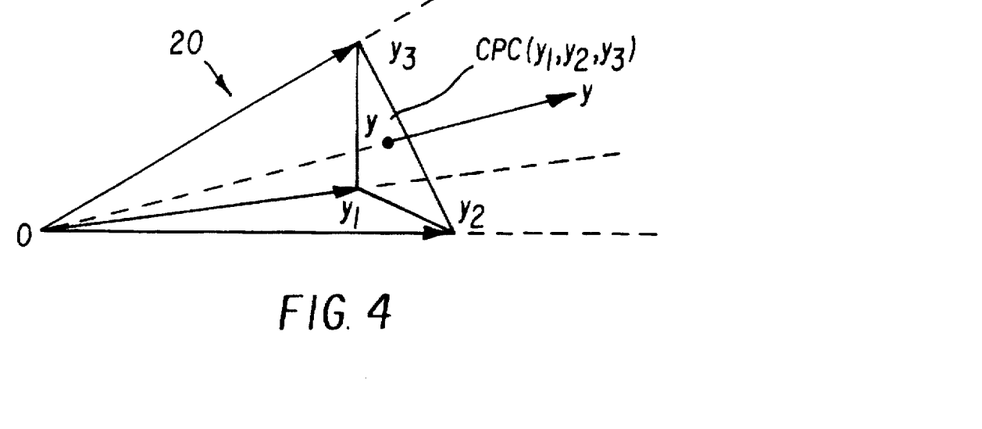
FIG. 4 illustrates a convex polyhedral cone formed by three vectors $y_1$, $y_2$, $y_3$.

FIG. 4 depicts a portion of a convex polyhedral cone 20 defined by three points $y_1$, $y_2$ and $y_3$ which encloses the vector y. The other portion is an infinite range obtainable by extending the three vectors associated with the points $y_1$, $y_2$ and $y_3$ to infinity.

Whether or not a given vector y is enclosed by the convex polyhedral cone defined by $Y=\{y_1, y_2, \ldots, y_n\}$ in $R^d$ can be determined by procedure 1:

Procedure 1: Determine if $y \in CPC(Y)$.

1) Add $y_{n+1}=(1,0,\ldots,0)^T, \ldots, y_{n+d}=(0,0,\ldots,1)^T$ to $y_1$, $y_2, \ldots, y_n$, where T denotes the transpose of a vector and where $y_{n+1}, \ldots, y_{n+d}$ are unit vectors.

2) Solve the following linear programming problem:

$$\text{Minimize} \sum_{i=n+1}^{n+d} \alpha_i$$

-continued subject to $\sum_{i=1}^{n+d} \alpha_i y_i = y, \alpha_1, \ldots, \alpha_{n+d} \geq 0$.

3) If Minimizing $$\sum_{i=n+1}^{n+d} \alpha_i > 0,$$

then we conclude $y \notin CPC(Y)$ (y is not enclosed by the cone); otherwise, $y \in CPC(Y)$, and in this case, procedure 1 returns n coefficients $\alpha_1, \ldots, \alpha_n$ satisfying equation (3).

Procedure 1 is a general method to solve the convex polyhedral cone inclusion problem. What the present invention is concerned with is a special case where d=n=3 and the cone is defined by a triangle. As we shall see shortly, in this case there is a need to find the intersection of a line defined by a vector y and the plane defined by 3 points $y_1$, $y_2$, $y_3$. Referring to FIG. 4, if y is enclosed by $CPC(y_1, y_2, y_3)$, then procedure 1 will return 3 coefficients $\alpha_1, \alpha_2, \alpha_3$ satisfying:

$$y = \sum_{i=1}^{3} \alpha_i y_i, \alpha_1, \alpha_2, \alpha_3 \geq 0. \tag{4}$$

Normalizing the coefficients in equation (4) by $\alpha = \alpha_1 + \alpha_2 + \alpha_3$, we obtain:

$$y' = \sum_{i=1}^{3} \alpha'_i y_i, \ldots y' = y/\alpha, \alpha'_i = \alpha_i/\alpha, \alpha'_i \leq 0, \alpha'_1 + \alpha'_2 + \alpha'_3 = 1. \tag{5}$$

Equation (5) indicates that the point y is enclosed by the convex hull of the three points $y_1$, $y_2$ and $y_3$. Since the convex hull of $y_1$, $y_2$, $y_3$ is a triangle, y' is in the plane defined by $y_1$, $y_2$, $y_3$. The intersection computation is described by procedure 2 set forth below.

Procedure 2: Determine the intersection of a line defined by y and the plane defined by $y_1$, $y_2$, $y_3$ where $y \in CPC(y_1, y_2, y_3)$.

1) Apply procedure 1 to find 3 coefficients $\alpha_1, \alpha_2, \alpha_3$ satisfying equation (4);

2) Compute the intersection point y' by equation (5).

Figure 5:
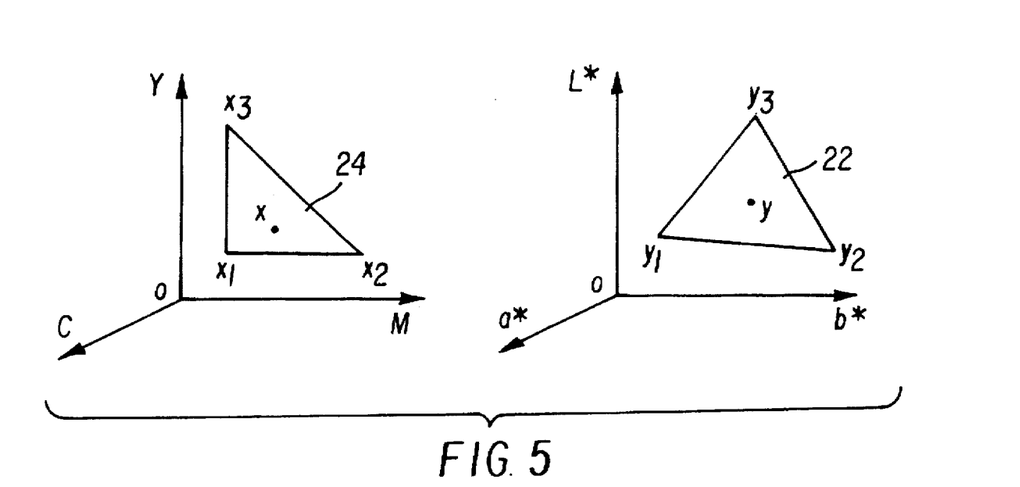
FIG. 5 shows corresponding triangles in a device dependent and an independent space.

In the related application previously mentioned, a convex interpolation method for color calibration is described. A special case of convex interpolation with 3 points in $R^3$ will now be discussed. In this case, the convex interpolation is called "triangle" interpolation. As illustrated in FIG. 5, $y_1$, $y_2$, $y_3$ are three points of a triangle 22 in the L*a*b* space, and $x_1$, $x_2$, $x_3$ are the corresponding points of a triangle 24 in the CMY space. Let y be a given point in L*a*b* which is inside the convex hull of $y_1$, $y_2$, $y_3$ (a triangle), i.e., $y \in CH(y_1, y_2, y_3)$. The system needs to compute corresponding point x in CMY by interpolation. Applying the convex hull inclusion procedure described in detail in the related application, three coefficients $\alpha_1 \alpha_2 \alpha_3$ are obtained satisfying:

$$y = \sum_{i=1}^{3} \alpha_i y_i, \sum_{i=1}^{3} \alpha_i = 1, \alpha_i \geq 0. \tag{6}$$

The system then interpolates by the triangle interpolation formula:

$$x = \sum_{i=1}^{3} \alpha_i x_i. \tag{7}$$

Details of triangle interpolation from CIEL*a*b* to CMY is given below in procedure 3.

Procedure 3: Interpolate a given point $y \in CH(y_1, y_2, y_3)$ by triangle interpolation.

1) Add unit vectors $y_4 = (1,0,0)^T$, $y_5 = (0,1,0)^T$, $y_6 = (0,0,1)^T$ to $y_1$, $y_2$, $y_3$.

2) Solve the following linear programming problem:

$$\text{Minimize } \sum_{i=4}^{6} \alpha_i$$

$$\text{subject to } \sum_{i=1}^{6} \alpha_i y_i = y, \sum_{i=1}^{6} \alpha_i = 1, \alpha_1, \ldots, \alpha_6 \geq 0.$$

3) Since $y \in CH(y_1, y_2, y_3)$, the procedure will return three coefficients $\alpha_1, \alpha_2, \alpha_3$ satisfying equation (6);

4) Compute x by equation (7).

Triangle interpolation is a 1—1 mapping from a triangle $CH(y_1, y_2, y_3)$ to a triangle $CH(x_1 x_2, x_3)$. It is invertible. That is, if x is the result obtained by triangle interpolation for y, then, applying the same procedure to interpolate x, we will obtain y.

With the above preparation, the gamut boundary can now be discussed. Referring to FIG. 2, the information available is the LUT which contains $N^3$ entries (N is usually in the range between 8 and 11). Among them, there are $6N^2 - 12N + 8$ entries on the surface of the cube 10 in CMY, and the same number of points on the gamut 12 boundary in L*a*b*. The system needs to estimate the gamut boundary based on the $6N^2 - 12N + 8$ points to create the gamut descriptor. First a discussion will be provided on how to define a gamut boundary, and then on how to compute the gamut descriptor.

Figure 6:
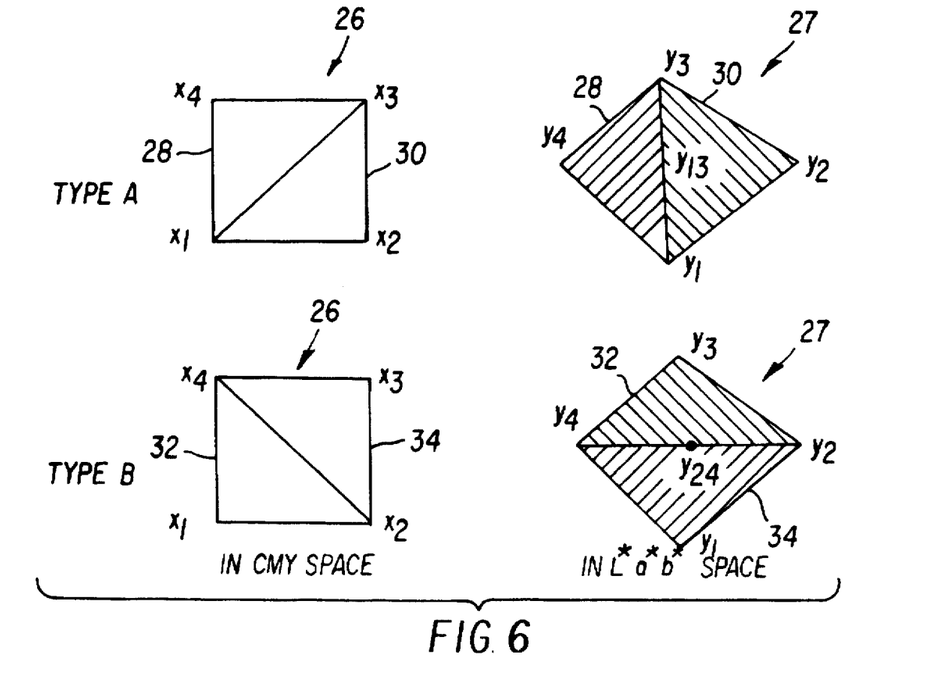
FIG. 6 illustrates alternative methods of dividing a square on the surface of a color cube into two triangles.
Figure 7:
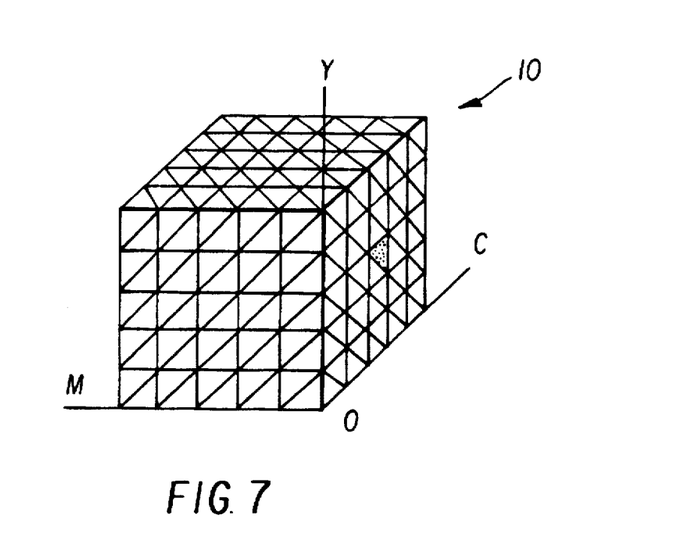
FIGS. 7 and 8 depict corresponding triangles on the surface of a color cube 10 and on the surface of the gamut 12.

Since the $N^3$ points in the LUT are lattice points in CMY, there are $N^2$ points on each of the 6 faces of the cube 10, which partition each face into $(N-1)^2$ squares (See FIG. 7). In total, there are $6(N-1)^2$ squares. As illustrated in FIG. 6 let $x_1, \ldots, x_4$ be the four corner points of a square 26 in CMY, and $y_1, \ldots, y_4$ be the corresponding 4 points of a polygon 27 in L*a*b*. The square 26 can be partitioned into two triangles 28 and 30 or 32 and 34 in one of two ways as shown in FIG. 6, type A and type B. If the four points $y_1, \ldots, y_4$ are not in a plane (this is usually the case when a curved gamut boundary is being considered), then one partition will lead to a convex shape for the portion of the gamut boundary defined by the four points $y_1, \ldots, y_4$, and the other partition will lead to a concave shape. The partition corresponding to convex shape can be determined by computing the middle point $y_{13}$ of $y_1$ and $y_3$, and the middle point $y_{24}$ of $y_2$ and $y_4$, and comparing their distances to axis L*. For convenience and speed, the squares may be partitioned into triangles using a regular division arrangement such as illustrated in FIG. 7. The corresponding triangles in L*a*b* space define the gamut boundary. The gamut boundary surface can also be defined by a set of small curved surfaces. However, this would increase the complexity in computing gamut boundary points and in determining if a signal is inside the gamut.

Figure 8:
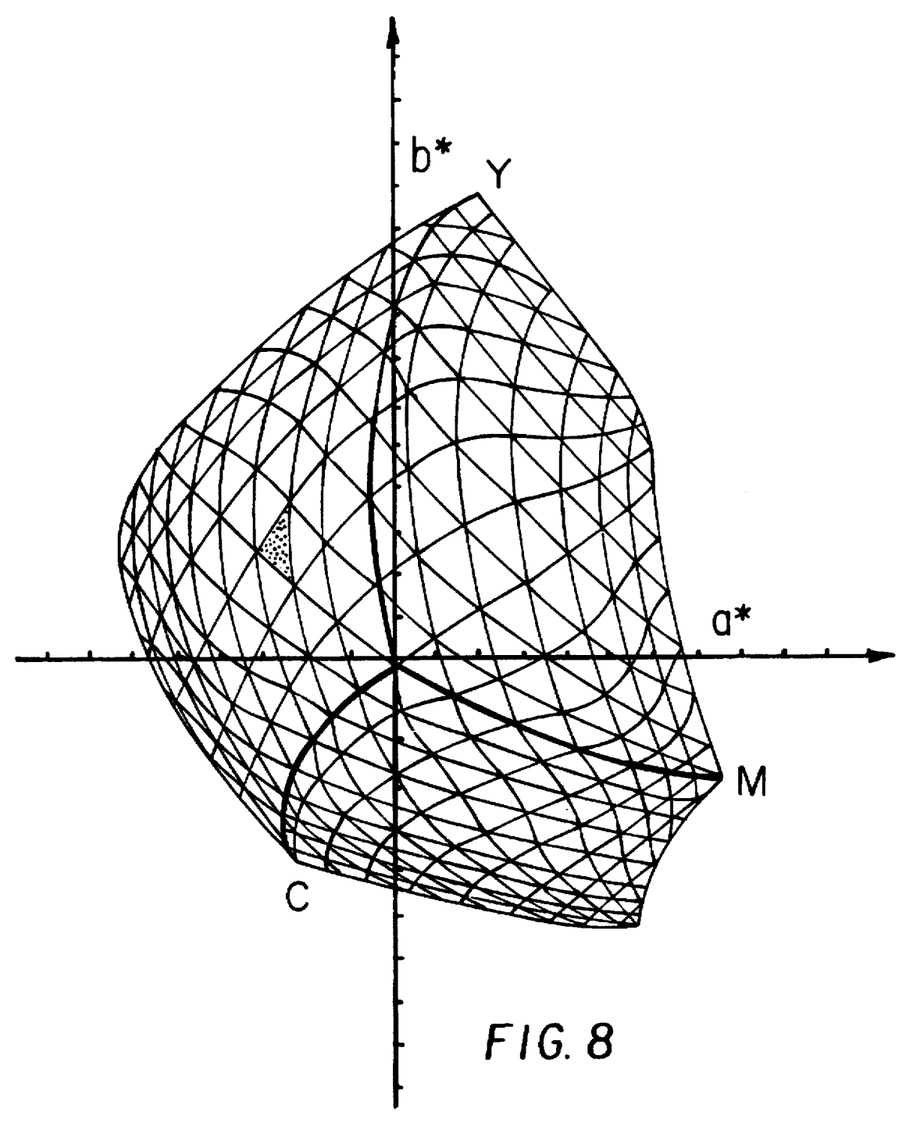

For each of the $6(N-1)^2$ squares, the system preferably uses the above regular division arrangement method to split it into 2 triangles. In total, we obtain $12(N-1)^2$ triangles in CMY and the same number of triangles in L*a*b*. Putting all the triangles in CMY together gives the surface of the cube 10 as illustrated in FIG. 7, and putting all the triangles in L*a*b* together gives the gamut 12 boundary as illustrated in FIG. 8 where the dark triangle in both Figures corresponds. These triangles may be stored in a triangle table (Table I) as follows.

TABLE I

Gamut Boundary Triangle Table

| Triangle Index | CMY | L*a*b* |
|---|---|---|
| 1 | $x_{11}, x_{12}, x_{13}$ | $y_{11}, y_{12}, y_{13}$ |
| 2 | $x_{21}, x_{22}, x_{23}$ | $y_{21}, y_{22}, y_{23}$ |
| ... | ... | ... |
| $12(N-1)^2$ | ... | ... |

An advantage of defining a gamut boundary in such a way is that there is a 1—1 corresponding relation between points on the surface of the cube 10 in CMY and points on the gamut boundary 12 in L*a*b*. And, determining such a 1—1 corresponding relation can be done easily. Procedure 4 summarizes the above discussion.

Procedure 4: Construct gamut boundary using triangles based on a LUT.

1) Read in the LUT with $N^3$ entries;
2) Split each of the $6(N-1)^2$ LUT squares into 2 triangles.
3) Store the $12(N-1)^2$ pairs of triangles in a table (Table I).

Figure 9:
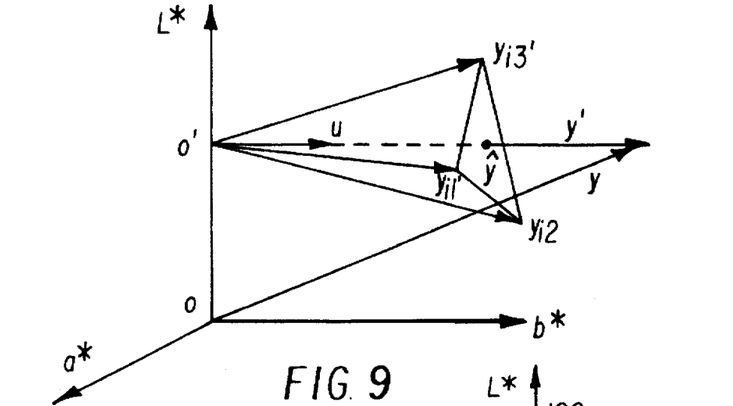
FIG. 9 illustrates a boundary point in a triangle.

Having defined the gamut boundary, we can now discuss how to determine whether or not a given point y=(l,a,b) in L*a*b* is in the gamut 12. Referring to FIG. 9, for each triangle $CH(y_{i1}, y_{i2}, y_{i3})$ in Table I, the origin O=(0,0,0) is conventionally translated to O'=(1,0,0) by:

$$y' = y - O', y'_{ij} = y_{ij} - O', j=1,2,3. \quad (8)$$

Procedure 1 is then used to find a triangle $CH(y'_{i1}, y'_{i2}, y'_{i3})$, whose convex polyhedral cone encloses y', i.e., y' ∈ $CPC(y'_{i1}, y'_{i2}, y'_{i3})$. Next procedure 2 is applied to find and the intersection __ of the line O' y', and the plane defined by the three points $y'_{i1}, y'_{i2}, y'_{i3}$. Since $CH(y'_{i1}, y'_{i2}, y'_{i3})$=CH$(y_{i1}, y_{i2}, y_{i3})$, whether or not the point or signal y is inside the gamut can be determined by comparing the lengths O __ and O'y'. Procedure 5 below describes this.

Procedure 5: Determine if a given point y=(l, a, b) is in gamut.

1) Apply Procedure 4 to compute Table I;
2) Use Procedure 1 to find a triangle $y_{i1}, y_{i2}, y_{i3}$ from Table I satisfying y' ∈ CPC $(y'_{i1}, y'_{i2}, y'_{i3})$ (Equation (8) describes the relationship between y and y' and other vectors);
3) Use Procedure 2 to determine the intersection __ of the line O' y' and the triangle $y'_{i1}, y'_{i2}, y'_{i3}$;
4) If |O'−_|<|O'−y'|, then y is out of gamut, otherwise, it is in gamut.

Now a discussion can be provided as to how to create a gamut descriptor for a given device. As previously discussed a device gamut descriptor is a set of carefully selected gamut boundary points in L*a*b*. There is a certain predetermined pattern to the distribution of these points. For example, they may be located on a set of planes perpendicular to axis L*, the number of points on each plane may be fixed, and the angle between two adjacent points on a plane may be a constant. An example is given below.

Figure 10:
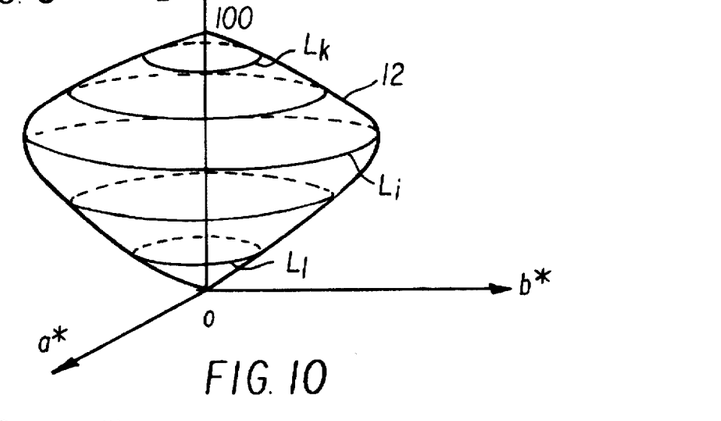
FIG. 10 depicts dividing a gamut into K layers along L*.
Figure 11:
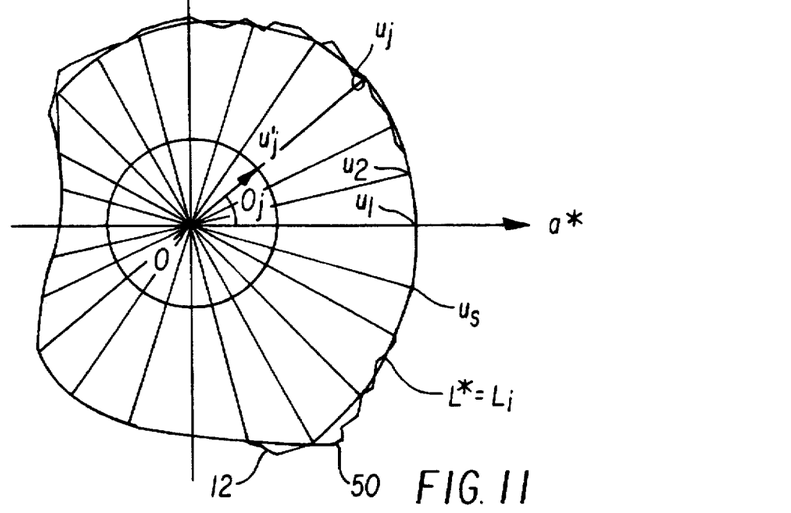
FIG. 11 depicts unit vectors $u_j'$ and the gamut boundary point $u_j$ along the direction $u_j'$ on a layer $L_i$.

To construct a gamut descriptor the system first slices the axis L* of the gamut 12 using k planes, L*=$L_1, L_2, ..., L_k$, perpendicular to the axis L* as shown in FIG. 10. The intersection of the gamut 12 and a plane L*=$L_i$ is a polygon 50 with irregular vertices as shown in FIG. 11. The system then selects equally angled points $u_1, ..., u_s$ on the polygon boundary (these points could be off the polygon boundary a little bit for a better result). The angle of $u_j$ is given by $\theta_j = (j-1) \times 360/s$ degree, j=1,2,...,s. The s points approximately describe the gamut boundary at layer L*=$L_i$. When this procedure is applied to each layer, a total, of k×s gamut boundary points are obtained. For each of the points, triangle interpolation (Procedure 3) is used to compute the corresponding point on the surface of the cube in CMY. The system then stores all the data into a gamut descriptor table (Table II) as set forth below.

TABLE II

Gamut Descriptor Table

| Layer | L*a*b* | CMY |
|---|---|---|
| $L_1$ | $y_{11}, ..., y_{1s}$ | $x_{11}, ..., x_{1s}$ |
| $L_2$ | $y_{21}, ..., y_{2s}$ | $x_{21}, ..., x_{2s}$ |
| ... | ... | ... |
| $L_k$ | $y_{k1}, ..., y_{ks}$ | $x_{k1}, ..., x_{ks}$ |

The size of the gamut descriptor is determined by the accuracy required. In normal applications, k may be set to be around 20, and s is set to around 180. Procedure 6 summarizes this.

Procedure 6: Construct a gamut descriptor (Table II) based on a LUT.

1) Apply Procedure 4 to obtain Table I;
2) Read in the number k of layers, and the number s of gamut boundary points on each layer.
3) For each layer L*=$L_i$, and each unit vector $u'_j$ on the layer (the angle of $u'_j$ is (j−1)×360/s degree)

3.1) Use Procedure 5 to find the gamut boundary point $u_j$ along the direction defined by $u'_j$, and Procedure 5 also returns three coefficients $\alpha_1, \alpha_2, \alpha_3$ satisfying $u_j = \alpha_1 y_{t1} + \alpha_2 y_{t2} + \alpha_3 y_{t3}$, $\alpha_1 + \alpha_2 \alpha_3 = 1$, $\alpha_1, \alpha_2, \alpha_3 \geq 0$ where $y_{t1}, y_{t2}, y_{t3}$ correspond to the t-14 th triangle in Table I;

3.2) Interpolate $u_j$ by: $v_j = \alpha_1 x_{t1} + \alpha_2 x_{t2} + \alpha_3 x_{t3}$, where $x_{t1}, x_{t2}, x_{t3}$ are the corresponding points of $y_{t1}, y_{t2}, y_{t3}$;

3.3) Store the pair $u_j$ and $v_j$ in Table II;

4) Output gamut descriptor Table II.

Figure 12:
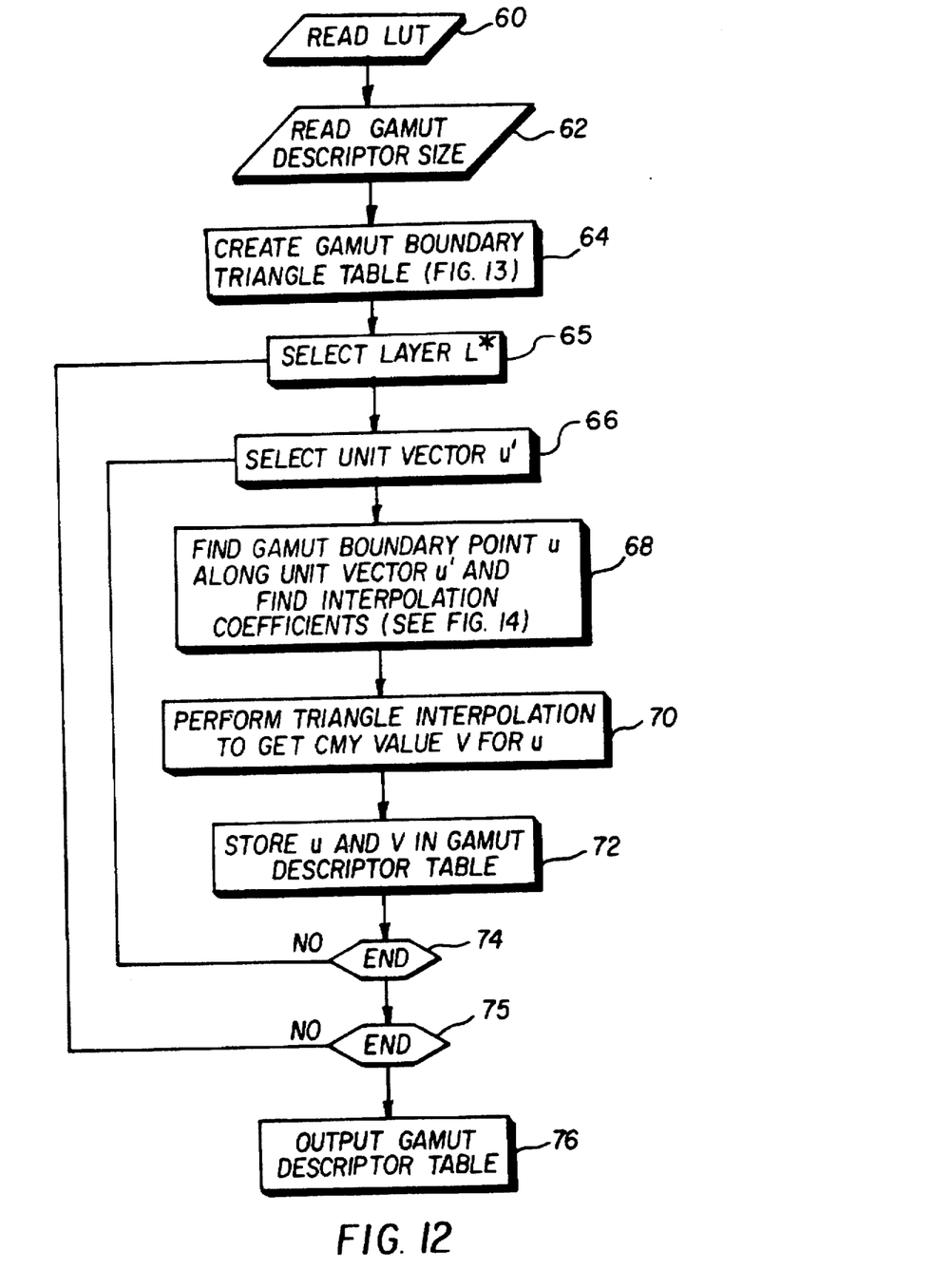
FIGS. 12–15 depict flowcharts of the present invention.

FIGS. 12–15 illustrate the procedures 1–6 previously discussed. As illustrated in FIG. 12, the first step 60 is to read the look-up table for converting points from the device dependent space, such as CMY, to the device independent space, such as L*a*b*. The next step is to read the size of the gamut descriptor that is desired. The system then creates 64 the gamut boundary triangle table, the flow of which is illustrated in more detail in FIG. 13. Once the triangle table is created a layer is selected 65, a unit vector from among the layers is selected 66 and the gamut boundary point along the unit vector is determined 68 along with the interpolation coefficients. This operation flow will be discussed in more detail with respect to FIG. 14. Next the system performs 70 the triangle interpolation to obtain the corresponding value in CMY for the boundary point. Once the corresponding point is determined the pair of points are stored 72 in the gamut descriptor table. If no other layers and unit vectors need to be processed the system outputs 76 the gamut descriptor table.

Figure 13:
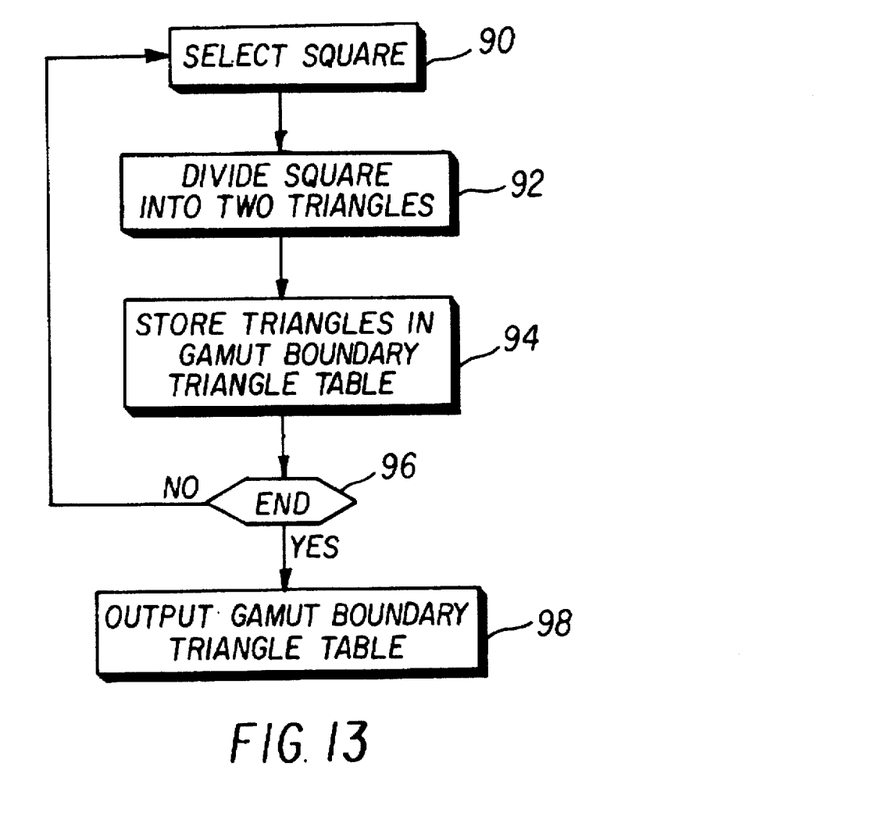

The operation of creating the gamut boundary table starts, as illustrated in FIG. 13, by selecting 90 a square which needs to be divided. This selection can be sequential. The square is divided 92 into two triangles as previously discussed and the triangles are stored in the gamut boundary triangle table. If all of the squares have been processed the gamut boundary triangle table is output 98.

Figure 14:
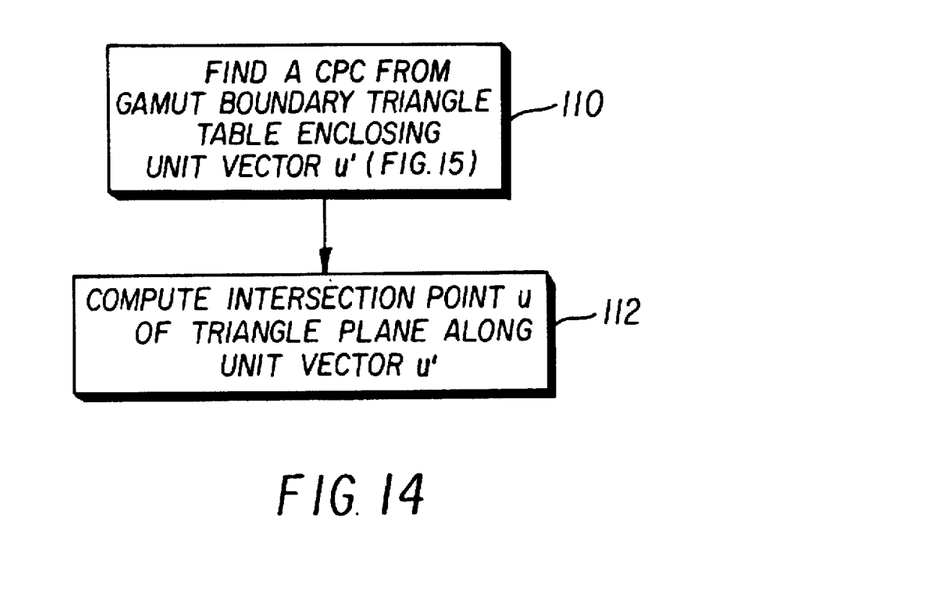

To find the gamut boundary point the system, as illustrated in FIG. 14, first finds 110 the convex polyhedron cone defined by a triangle in the gamut boundary table which encloses the unit vector. The flow of this operation will be discussed in more detail with respect to FIG. 15. Once the triangle is determined the intersection point of the unit vector with the gamut boundary can be easily determined 112.

Figure 15:
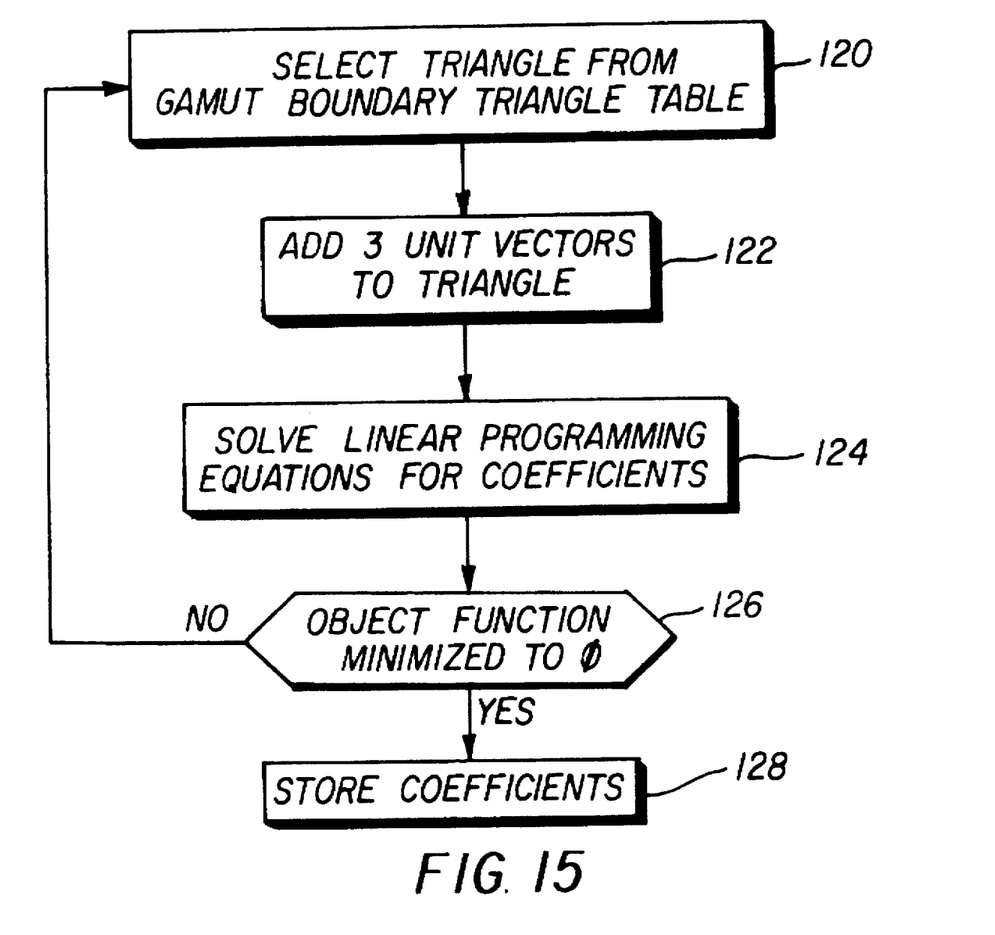

In finding the triangle which encloses the unit vector in accordance with the steps illustrated in FIG. 15, the triangle table I must be searched for candidate triangles which may satisfy the enclosure requirements. To facilitate this search a triangle range table (Table III) as illustrated below is created at the same time the triangle table previously discussed is created. This table III can be combined with the table I if desired.

TABLE III

| | Triangle Range Table | | | |
|---|---|---|---|---|
| | L* Range | | Angle Range | |
| Triangle Index | Min. | Max. | Min. | Max. |
| 1 | $l_{11}$ | $l_{12}$ | $\theta_{11}$ | $\theta_{12}$ |
| 2 | $l_{21}$ | $l_{22}$ | $\theta_{21}$ | $\theta_{22}$ |
| . | . | | | |
| . | . | | | |
| . | | | | |
| $12(N-1)^2$ | | | | |

In using this table it should be noted that a unit vector has associated therewith a value along the L* (lightness) axis to which the unit vector has been translated as illustrated in FIG. 9. This L value is used to scan the triangle range table to select for triangles where the L* value of the unit vector fits between the minimum and maximum range (L* Range) of the triangle. A unit vector also has associated therewith an angle θ as illustrated in FIG. 10. This angle is used to scan the triangle candidates found in the first scan to select triangles with the appropriate angle range as final candidates. Once a final candidate triangle has been selected the system adds three unit vectors to the triangle and then solves 124 the conventional linear programming problem. The solution is used 126 to determine if the object function has been minimized to 0 and if so the coefficients are stored 128. If not the next final candidate from the triangle table III is examined.

The previously described embodiment was directed to a method of creating a gamut descriptor for a three color device (e.g. R,G,B or C,M,Y). The method included the following procedures:

1) A procedure to determine if a given vector y is enclosed by the convex polyhedral cone defined by:

$Y=\{y_1, y_2, \ldots y_n\}$.

2) A procedure to determine the intersection of a line defined by y and the plane defined by $y_1$, $y_2$, $y_3$ where:

$y \in CPC(y_1,y_2,y_3)$.

3) A procedure to interpolate a given point $y \in CH(y_1,y_2,y_3)$ by triangle interpolation.

4) A procedure to construct a gamut boundary using triangles based on a lookup table.

5) A procedure to determine if a given point y=(1,a,b) is in gamut.

6) A procedure to construct a gamut descriptor based on a lookup table.

Of these procedures, the only one which is related to the specific type of output device is Procedure 4 which described a procedure for a three color device characterized by an $N^3$ lookup table. Procedures 5 and 6 use the data table created by Procedure 4, but do not themselves specifically make any assumptions about the device type. To extend the method to 4-color output devices, it is therefore only necessary to generalize Procedure 4, and all of the following procedures can be applied directly to produce the desired gamut boundary description.

Consider a 4-color output device having 4 different colorants, cyan, magenta, yellow, and black (CMYK). As with a 3-color printer, the device response can be characterized by determining the color values (in a device-independant color space) for a regular lattice of input color values spanning the range of possible colorant levels. The only difference is that since there are 4 input channels, the lattice will be a 4-dimensional lattice rather than a 3-dimensional lattice. For the purposes of this description it will be assumed that the lattice consists of $N_c$ different cyan levels, $N_m$ different magenta levels, $N_y$ different yellow levels and $N_k$ different black levels. Note that this is a slight generalization of the method described above, where it was assumed that $N=N_c=N_m=N_y$.

Figure 16:
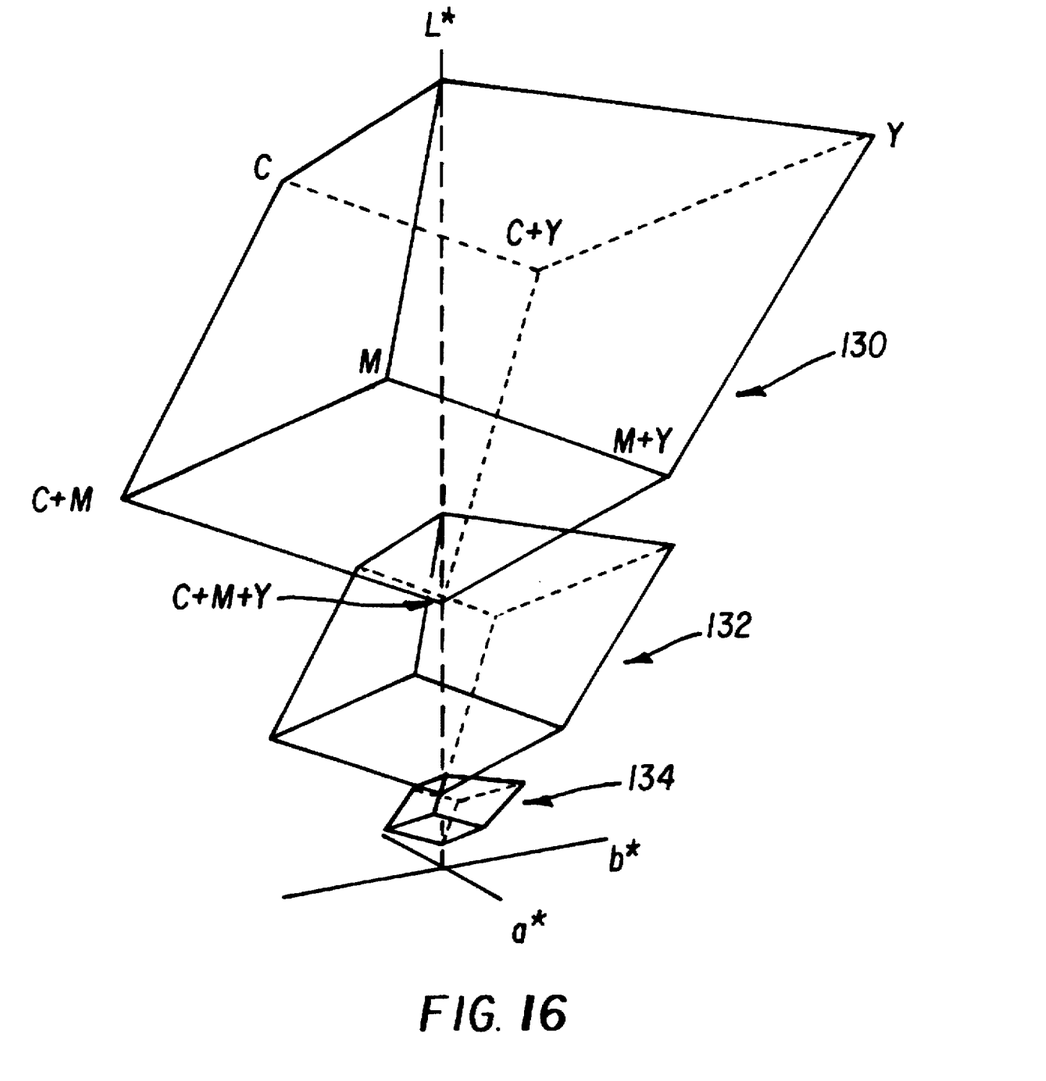
FIGS. 16 and 17 depict the gamut and gamut surface, respectively, of a four color device.
Figure 17:
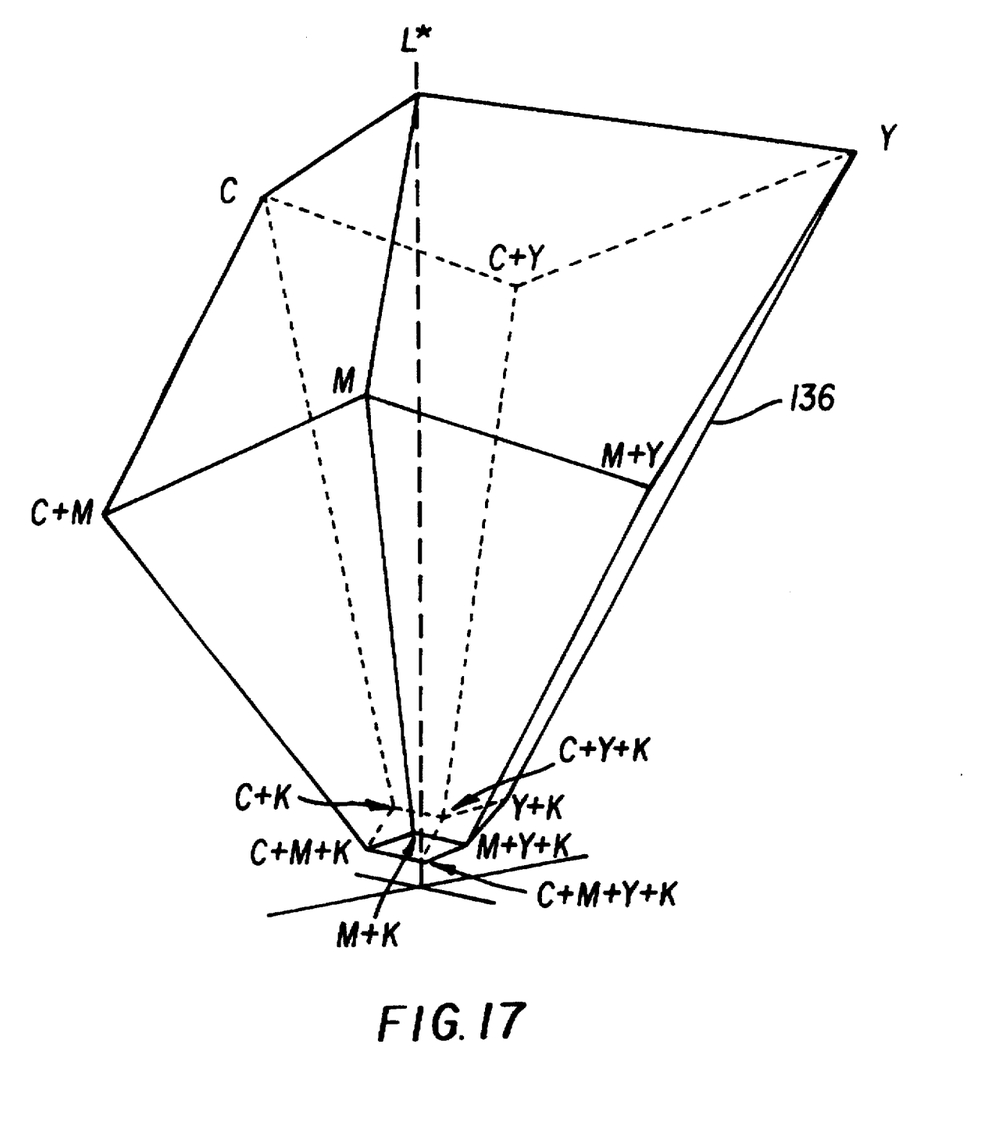

For each black level of the 4-color device, there will be a 3-dimensional lattice of input values where the cyan, magenta, and yellow colorants span the range of possible values. Each one of these lattices will be analogous to the lattice formed for a 3-color printer. FIG. 16 shows several of these 3-dimensional lattices mapped into L*a*b* space corresponding to different black levels for a typical CMYK printer. The lattice corresponding to zero black level is designated 130, for fifty percent 132, and for full black, 134. The envelope of all of these 3-dimensional gamuts will define the overall color gamut of the printer. This overall envelope 136 is shown in FIG. 17. In contrast to a 3-color printer, there will be no unique relationship between the device-independent color value, and the color values associated with the given device. This is due to the fact that, in general, each of the colors inside the gamut can be produced using a range of possible black levels. This can be seen by considering the fact that each of the 3-dimensional lattices associated with different black levels will overlap. However, the colors on the surface of the gamut 136 are an exception to this rule. For these colors, there is only a single black level which can be used to produce each output color value.

For a 3-color device it was shown that the gamut boundary will be composed of 6 surfaces (corresponding to the six surfaces of the input lattice) each of which can be subdivided into $2(N-1)^2$ triangles. Each of the six surfaces correspond to the case where one of the input values is at its minimum or maximum level. Consideration of FIG. 17 shows that a 4-color device will have twelve surfaces that make up the gamut boundary instead of only six. For each of these surfaces, two of the colorants will vary, and the other two will be at either their minimum or maximum levels. It can be seen that the top three surfaces of the gamut 136 in FIG. 17 correspond to three of the surfaces of the 3-color gamut where no black colorant is used. Likewise, the three lower surfaces correspond to three of the surfaces of the 3-color gamut where the black level is maximum. The other six surfaces are formed by connecting edges of the upper surfaces by varying the black level. Each of the surfaces will contain a 2-dimensional grid of lattice points in the device-independent color space formed by varying two of the input values. As with the 3-color printer case described above, each of these grids can be divided into a series of triangles to approximate the surface of the color gamut. Table IV summarizes the input values associated with each surface, as well as the number of triangles which can be formed from the grid of lattice points on the surface.

TABLE IV

Range of input values and number of triangles for each surface.

| surface # | cyan | magenta | yellow | black | # triangles |
|---|---|---|---|---|---|
| 1 | min–max | min–max | min | min | $2(N_c-1)(N_m-1)$ |
| 2 | min–max | min | min–max | min | $2(N_c-1)(N_y-1)$ |
| 3 | min | min–max | min–max | min | $2(N_m-1)(N_y-1)$ |
| 4 | max | min | min–max | min–max | $2(N_y-1)(N_k-1)$ |
| 5 | max | min–max | min | min–max | $2(N_m-1)(N_k-1)$ |
| 6 | min–max | max | min | min–max | $2(N_c-1)(N_k-1)$ |
| 7 | min | max | min–max | min–max | $2(N_y-1)(N_k-1)$ |
| 8 | min | min–max | max | min–max | $2(N_m-1)(N_k-1)$ |
| 9 | min–max | min | max | min–max | $2(N_c-1)(N_k-1)$ |
| 10 | min–max | min–max | max | max | $2(N_c-1)(N_m-1)$ |
| 11 | min–max | max | min–max | max | $2(N_c-1)(N_y-1)$ |
| 12 | max | min–max | min–max | max | $2(N_m-1)(N_y-1)$ |

From Table IV it can be seen that the total number of triangles which make up the entire gamut surface will be:

$$N_{rt}=4(N_c-1)(N_m-1)+4(N_c-1)(N_y-1)+4(N_m-1)(N_y-1)+4(N_c-1)(N_k-1)+4(N_m-1)(N_k-1)+4(N_y-1)(N_k-1). \quad (9)$$

If $N=N_c=N_m=N_y=N_k$, this reduces to $N_{rt}=24(N-1)^2$ which is double the number of triangles associated with an $N^3$ lattice of points for a 3-color device. This is consistent with the fact that there are twice as many $N^2$ surfaces (12 instead of 6) which make up the gamut boundary.

The procedure to compute the table of triangles which make up the gamut boundary for a 4-color device can be stated with only a slight modification to previously described Procedure 4 as follows:

Modified Procedure 4; Construct gamut boudary using triangles based on a LUT.

1) Read in the LUT with $N_c \cdot N_m \cdot N_y \cdot N_k$ entries.

2) Split each of the squares on the 12 exterior surfaces of the LUT specified by Table IV into two triangles, giving a total of $N_{rt}$ triangles.

3) Store the $N_{rt}$ triangles in a table recording the input values (i.e. CMYK), and the device-independent output values (i.e. L*a*b*) for each corner of the triangle.

Once the table of triangles is formed, the other procedures described above can then be used to construct the gamut descriptor. It should be noted that the present invention could be extended, in the same manner as it was extended to the 4-color example, to any number of colorant channels. For example, so-called "Hi-Fi color" devices have recently been demonstrated which use 7 different inks (generally cyan, magenta, yellow, red, green, blue, and black). Also, the printing industry frequently uses specialty inks (beyond cyan, magenta, yellow, and black) to produce special colors such as trademark colors. For cases such as these, the above method could be adapted to describe the gamut surface in a similar manner. The steps of Procedure 4 of the present invention applied to a general set of colorants are as follows:

Generalized Procedure 4: Construct gamut boundary using triangles.

1) Characterize the color reproduction characteristics as a function of the set of colorants used for the given application by determining the device-independent color values associated with a lattice of input values.

2) Determine which nodes in the lattice of input values lie on the surface of the gamut.

3) Form triangles from the surface lattice nodes.

Depending on the particular set of colorants, this procedure may vary in its complexity due to the fact that it may not be as straight forward to determine which nodes lie on the gamut surface as it is in the case of conventional RGB, CMY, or CMYK devices.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of creating and using a four color device gamut descriptor, the gamut having 12 external surfaces, comprising the steps of:
   (a) selecting gamut boundary signals from the 12 gamut surfaces in a predetermined regularly spaced pattern in a three dimensional device independent color space, the selected signals representing the device gamut descriptor; and
   (b) storing the gamut boundary signals defining the device gamut descriptor for use in determining whether a color signal is within the gamut of the four color device, wherein step (a) comprises the steps of:
      (1) slicing the gamut expressed in a device independent color space using parallel planes separated by a predetermined distance;
      (2) selecting unit vectors in each plane separated by a predetermined angle; and
      (3) determining the intersection point of each unit vector and the gamut boundary and generating a signal representing the intersection point by;
         (i) defining a set of convex polyhedral cones using points on the gamut boundary;
         (ii) finding a convex polyhedral cone enclosing each unit vector;
         (iii) determining convex coefficients; and
         (iv) determining the intersection point using the coefficients;
   (c) selecting a test point along the unit vector;
   (d) comparing the test point to the intersection point with a result of the comparison indicating whether the test point is in the gamut; and
   (e) identifying the colors falling outside the gamut descriptor to within the reproducible gamut of the device and processing these colors for display.

2. A method as recited in claim 1, wherein step (ii) comprises the steps of:
   (a) adding a number of unit vectors to the point set which forms a convex polyhedral cone; and
   (b) determining a linear programming solution which minimizes the sum of the convex coefficients.

3. A method as recited in claim 1, wherein the intersection point is determined by interpolating the unit vector with the convex coefficients.

4. A method as recited in claim 1, wherein step (i) comprises the steps of:

(a) dividing each surface of the 12 external surfaces of the color gamut in device dependent color space into squares;

(b) dividing each square into two triangles;

(c) designating the gamut boundary surface as a set of corresponding triangles in device independent color space; and (d) defining a set of convex polyhedral cones using the corners of the triangles in the device independent color space.

5. A method as recited in claim 4, wherein step (iv) comprises performing a triangle interpolation using a triangle on the gamut boundary corresponding to the convex polyhedral cone found in step (ii) and the convex coefficients.

6. An apparatus for creating and using a four color device gamut boundary descriptor, the device gamut having 12 external surfaces, comprising:

input means for reading a look-up table for translating a 4-channel device dependent color signal into a three dimensional device independent color space;

table means for creating a gamut boundary table including boundary triangles on the 12 external surfaces of the device gamut;

selection means for selecting boundary triangles enclosing each of a predetermined regularly spaced pattern of device independent space color signals, the selection means including means for slicing the gamut expressed in a device independent color space using parallel planes separated by a predetermined distance;

means for selecting unit vectors in each plane separated by a predetermined angle; and means for determining the intersection point of each unit vector and the gamut boundary and generating a signal representing the intersection point by;
  (i) defining a set of convex polyhedral cones using points on the gamut boundary;
  (ii) finding a convex polyhedral cone enclosing each unit vector:
  (iii) determining convex coefficients; and
  (iv) determining the intersection point using the coefficients:

interpolation means for performing a triangle interpolation for each device independent color signal creating a gamut boundary descriptor list;

storage means for storing the gamut boundary descriptor list for determining whether a color signal is within a gamut;

means for selecting a test point along a unit vector;

means for comparing the test point to the intersection point with a result of the comparison indicating whether the test point is in the gamut; and means for identifying the colors falling outside the gamut descriptor to within the reproducible gamut of the device and processing these colors for display.

7. A method of creating and using a K-color gamut boundary descriptor using triangles, for a K-color device employing a set of K colorants, comprising the steps of:

a) characterizing color reproduction characteristics of the K-color device as a function of the set of colorants used by the device by determining device-independent color values associated with a regularly spaced lattice of input values by
  (1) slicing the gamut expressed in a device independent color space using parallel planes separated by a predetermined distance;
  (2) selecting unit vectors in each plane separated by a predetermined angle; and
  (3) determining the intersection point of each unit vector and the gamut boundary and generating a signal representing the intersection point by;
    (i) defining a set of convex polyhedral cones using points on the gamut boundary;
    (ii) finding a convex polyhedral cone enclosing each unit vector:
    (iii) determining convex coefficients; and
    (iv) determining the intersection point using the coefficients;

b) determining all nodes in the lattice of input values which lie on the gamut boundary to produce an array of squares on the gamut boundary having the nodes at the corners of the squares;

c) forming regularly spaced triangles from the surface lattice nodes by splitting each of the squares into two triangles;

d) storing signals representing these triangles in a table;

e) selecting a test point along a unit vector;

f) comparing the test point to the intersection point with a result of the comparison indicating whether the test point is in the gamut; and g) identifying the colors falling outside the gamut descriptors to within the reproducible gamut of the device and processing these colors for display.

* * * * *